(12) United States Patent
Rodriguez Bravo et al.

(10) Patent No.: US 11,449,800 B2
(45) Date of Patent: Sep. 20, 2022

(54) MACHINE-LEARNED DATA MANAGEMENT BETWEEN DEVICES

(71) Applicant: KYNDRYL, INC., New York, NY (US)

(72) Inventors: Cesar Augusto Rodriguez Bravo, Alajuela (CR); Kevin Jimenez Mendez, Heredia (CR); Sarbajit K. Rakshit, Kolkata (IN); Craig M. Trim, Ventura, CA (US)

(73) Assignee: Kyndryl, Inc., New York, NY (US)

( * ) Notice: Subject to any disclaimer, the term of this patent is extended or adjusted under 35 U.S.C. 154(b) by 381 days.

(21) Appl. No.: 16/798,563

(22) Filed: Feb. 24, 2020

(65) Prior Publication Data

US 2021/0264313 A1     Aug. 26, 2021

(51) Int. Cl.
  *G06N 20/00*     (2019.01)
(52) U.S. Cl.
  CPC ..................... *G06N 20/00* (2019.01)
(58) Field of Classification Search
  CPC ................ G06N 20/00; G06N 20/20
  See application file for complete search history.

(56) References Cited

U.S. PATENT DOCUMENTS

| 7,076,736 B2 | 7/2006 | Hugh |
| 9,070,089 B1 | 6/2015 | Lin et al. |
| 2014/0285519 A1 | 9/2014 | Uusitalo et al. |
| 2015/0199010 A1 | 7/2015 | Coleman et al. |
| 2016/0035093 A1* | 2/2016 | Kateb ................ G02B 21/0012 382/131 |
| 2019/0073607 A1* | 3/2019 | Jia .......................... G06N 20/00 |
| 2020/0151611 A1* | 5/2020 | McGavran .............. H04W 4/40 |
| 2021/0049497 A1* | 2/2021 | Jia .......................... G06N 20/00 |

OTHER PUBLICATIONS

Mel et al., "The NIST Definition of Cloud Computing," National Institute of Standards and Technology, Information Technology Laboratory, Special Publication 800-145, Sep. 2011 (pp. 1-7).

(Continued)

*Primary Examiner* — Olugbenga O Idowu
(74) *Attorney, Agent, or Firm* — Erik Swanson, Esq.; Kevin P. Radigan, Esq.; Heslin Rothenberg Farley & Mesiti P.C.

(57) ABSTRACT

Management of machine-learned data between machine-learning devices is facilitated by a processor(s) obtaining a machine-learned data set of a first device, with the machine-learned data set of the first device being categorized machine-learned information. The processor(s) determines one or more device hardware requirements to use the machine-learned data set, and based on receiving a request to provide the machine-learned data set to a second device, determines whether the second device meets the one or more device hardware requirements to use the machine-learned data set of the first device. Based on determining that the second device meets the one or more device hardware requirements, the processor(s) provides the machine-learned data set of the first device to the second device to provide the categorized machine-learned information of the first device to the second device for use by the second device.

20 Claims, 13 Drawing Sheets

(56) References Cited

OTHER PUBLICATIONS

Yang et al., "Deep Learning for Fixed Model Reuse", 31st AAAI Conference on Artificial Intelligence (AAAI-17), Feb. 9, 2017 (pp. 2831-2837).
Somer, Peter, "Artificial Intelligence, Machine Learning and Cognitive Computing—IBM Digital Nordic", https://www.ibm.com/blogs/nordic-msp/artificial-intelligence-machine-learning-cognitive-computing/, published Nov. 20, 2017, downloaded Jan. 28, 2020 (2 pages).
Shen et al., "Amalgamating Knowledge Towards Comprehensive Classification", 33rd AAAI Conference on Artificial Intelligence (AAAI-19), Jul. 7, 2019 (pp. 3068-3075).
Sirobhushanam, Srinija, "Understanding Transfer Learning and Model Interpretability", https://blog.cloudera.com/understanding-transfer-learning-and-model-interpretability/, published Oct. 8, 2019, downloaded Oct. 31, 2019 (8 pages).
"Exporting Models for Prediction", AI & Machine Learning Products, https://cloud.google.come/ml-engine/docs/expoerting-for-prediction, published Oct. 24, 2019, downloaded Oct. 30, 2019 (7 pages).
"A Visual Introduction to Machine Learning", http://www.r2d3.us/visual-intro-to-machine-learning-part-1/?lipi=urn%3Ali%3Apage%3Ad_flagship3_pulse_read%3BR9B4rGtnTmSrw4DAoezDjQ%3D%3D, downloaded Jan. 28, 2020 (4 pages).

\* cited by examiner

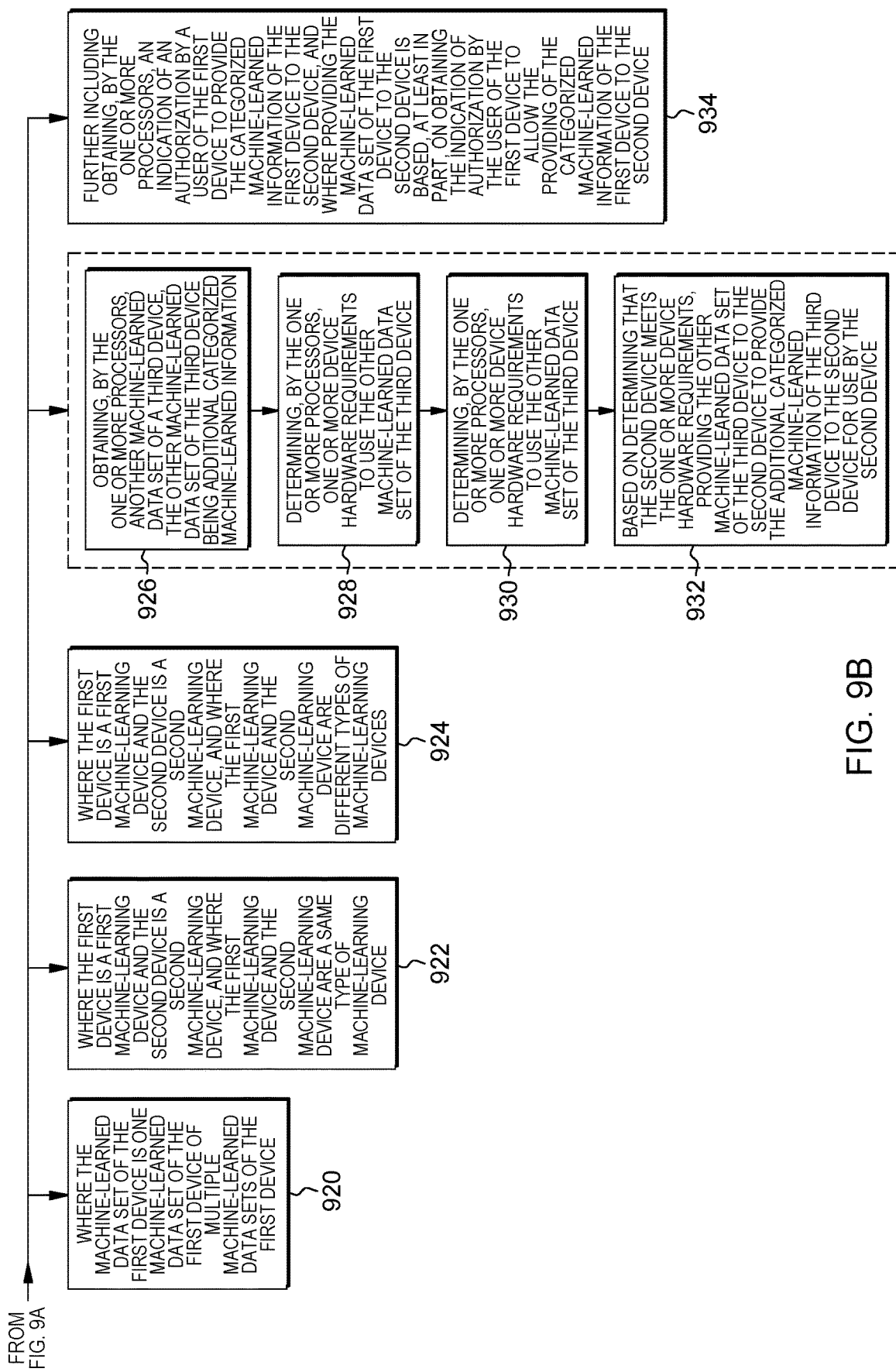

MACHINE-LEARNED DATA MANAGEMENT BETWEEN DEVICES

BACKGROUND

Machine-learning provides computers with the ability to continue learning without being pre-programmed after a manual. Machine-learning utilizes algorithms that learn from data and create insights based on the data.

Artificial intelligence refers to one or more computing machines working intelligently or cognitively. Intelligence emerges when machines, based on proliferation, are able to make decisions, which enhance chances of success in a given topic. By the use of machine-learning, artificial intelligence is able to learn from data to solve problems and provide relevant recommendations.

Cognitive computing systems are systems that utilize machine-learning and artificial intelligence to learn at scale, reason with purpose, and often interact with humans naturally. By means of self-teaching algorithms that utilize data mining, visual recognition, natural language processing, etc., a machine-learning computing system is able to, for instance, identify and solve problems.

SUMMARY

The shortcomings of the prior art are overcome and additional advantages are provided through the provision, in one or more aspects, of a computer-implemented method of managing machine-learned data. The method includes, obtaining, by one or more processors, a machine-learned data set of a first device, where the machine-learned data set of the first device is categorized machine-learned information, and determining by the processor(s) one or more device hardware requirements to use the machine-learned data set of the first device. Based on receiving a request to provide the machine-learned data set of the first device to a second device, the processor(s) determines whether the second device meets the one or more device hardware requirements to use the machine-learned data set of the first device. Based on determining that the second device meets the one or more device hardware requirements, the machine-learned data set of the first device is provided to the second device to provide the categorized machine-learned information of the first device to the second device for use by the second device.

Systems and computer program products relating to one or more aspects are also described and claimed herein. Further, services relating to one or more aspects are also described and can be claimed herein.

Additional features and advantages are realized through the techniques described herein. Other embodiments and aspects of the invention are described in detail herein and are considered a part of the claimed aspects.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

FIGS. 9A-9B depict a further workflow illustrating certain aspects of one or more embodiments of the present invention;

DETAILED DESCRIPTION

Figure 1:
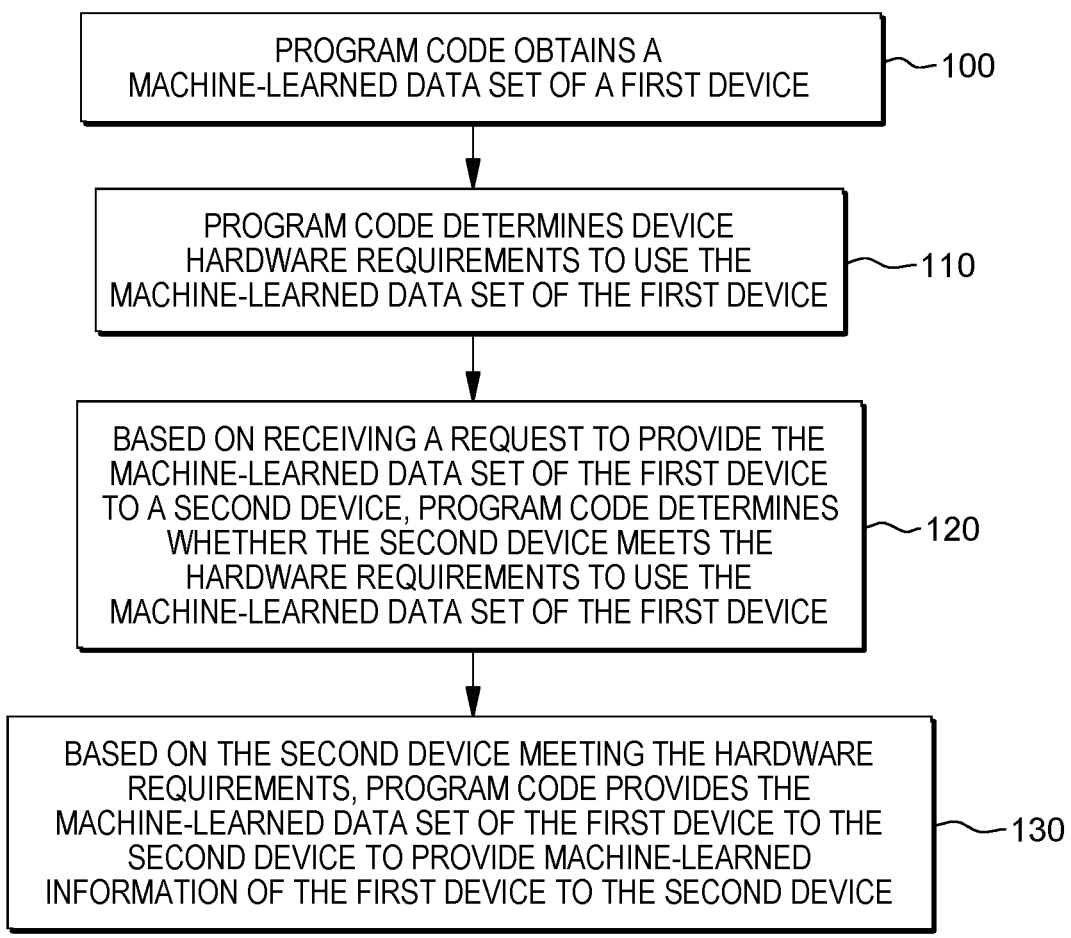
FIG. 1 is a workflow that illustrates certain aspects of some embodiments of the present invention.

The accompanying figures, in which like reference numerals refer to identical or functionally similar elements throughout the separate views, and which are incorporated in and form a part of this specification, further illustrate the present invention and, together with the detailed description of the invention, serve to explain aspects of the present invention. Note in this regard that descriptions of well-known systems, devices, processing techniques, etc., are omitted so as to not unnecessarily obscure the invention in detail. It should be understood, however, that the detailed description and this specific example(s), while indicating aspects of the invention, are given by way of illustration only, and not limitation. Various substitutions, modifications, additions, and/or other arrangements, within the spirit or scope of the underlying inventive concepts will be apparent to those skilled in the art from this disclosure. Note further that numerous inventive aspects and features are disclosed herein, and unless inconsistent, each disclosed aspect or feature is combinable with any other disclosed aspect or feature as desired for a particular application of the concepts disclosed herein.

Note also that illustrative embodiments are described below using specific code, designs, architectures, protocols, layouts, schematics, or tools only as examples, and not by way of limitation. Furthermore, the illustrative embodiments are described in certain instances using particular software, tools, or data processing environments only as example for clarity of description. The illustrative embodiments can be used in conjunction with other comparable or similarly purposed structures, systems, applications, or architectures.

One or more aspects of an illustrative embodiment can be implemented in hardware, software, or a combination thereof.

Figure 10:
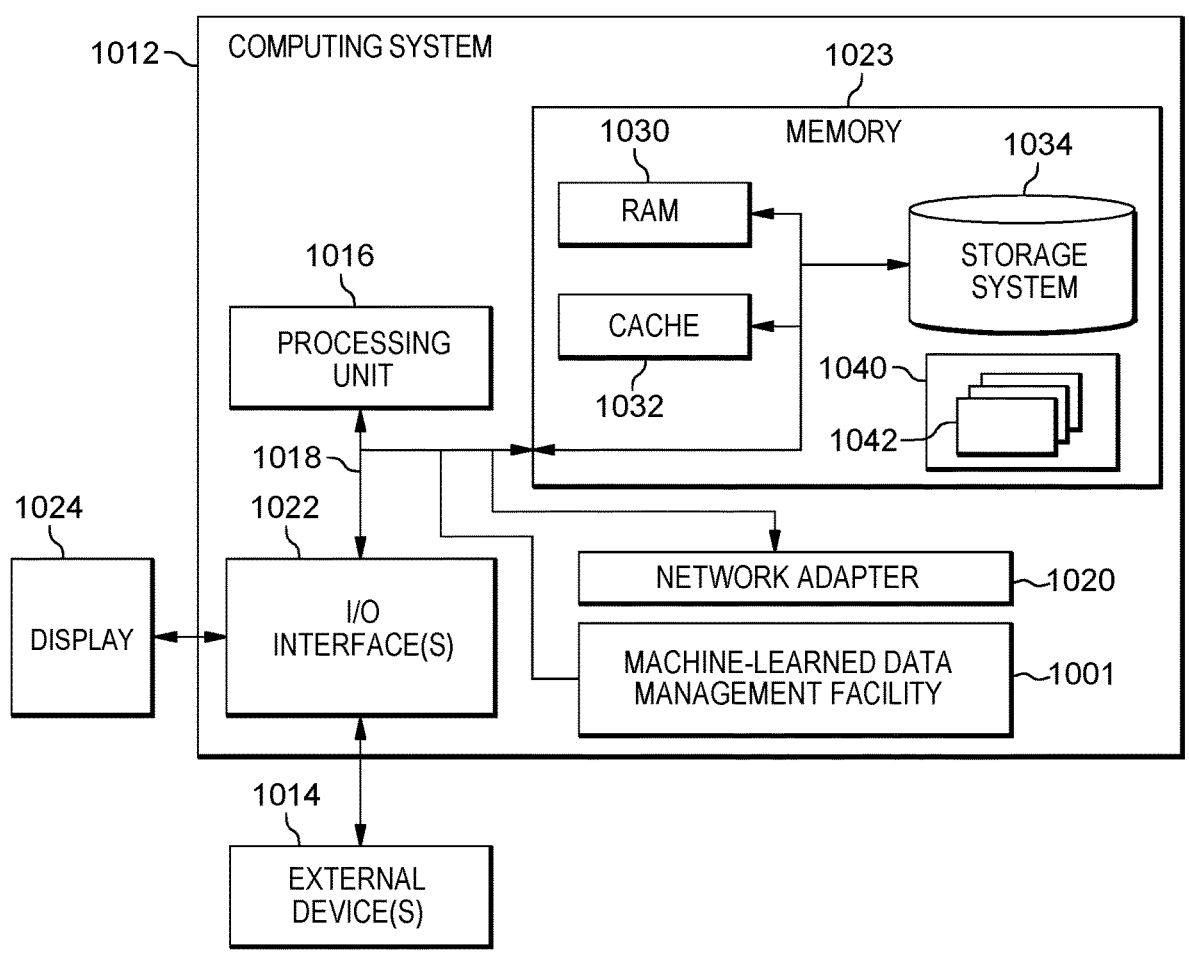
FIG. 10 depicts one embodiment of a computing node or system to implement or facilitate implementing machine-learned data management processing, in accordance with one or more aspects of the present invention.

As understood by one skilled in the art, program code, as referred to in this application, can include both software and hardware. For example, program code in certain embodiments of the present invention can include fixed function hardware, while other embodiments can utilize a software-based implementation of the functionality described. Certain embodiments combine both types of program code. One example of program code, also referred to as one or more programs, is depicted in FIG. 10 as program/utility 1040, having a set (at least one) of program modules 1042, which can be stored in memory 1023.

Embodiments of the present invention include a computer-implemented method, a system, and a computer program product, where program code executing on one or more processors obtains a machine-learned data set of a first device (i.e., a first machine-learning device), with the machine-learned data set of the first device being, for instance, categorized machine-learned information of the first device. Embodiments of the present invention further include program code that determines one or more device hardware requirements to use the machine-learned data set of the first device, and based on receiving a request to provide the machine-learned data set of the first device to a second device (i.e., a second machine-learning device), determines whether the second device meets the one or more device hardware requirements to use the machine-learned data set of the first device. Embodiments of the present invention also include program code that, based on determining the second device meets the one or more device hardware requirements, provides the machine-learned data set of the first device to the second device to provide the machine-learned information of the first device to the second device for use by the second device.

In certain embodiments of the present invention, providing the machine-learned information of the first device to the second device provides an additional machine-learned skill to the second device, or enhances an existing machine-learned skill of the second device.

In one or more embodiments of the present invention, program code executing on the one or more processors determines a category type of the machine-learned data set of the first device to provide categorized machine-learned information, and determines the one or more device hardware requirements to use the machine-learned data set of the first device using the category type of the machine-learned data set. In one embodiment, the category type is one category type of a group of category types including image recognition, voice recognition, natural language processing, sequence of actions, robotics, and/or conversation services, etc. In one or more embodiments, the category type of the machine-learned data set includes multiple sub-category types, and program code executing on the one or more processors determines a sub-category type of the multiple sub-category types of the machine-learned data set of the first device, and determining of the one or more device hardware requirements to use the machine-learned data set of the first device includes using the category type and the sub-category type of the machine-learned data set of the first device in determining the one or more device hardware requirements.

In one or more embodiments of the present invention, program code executing on the one or more processors determines a first machine-learned skill of the first device using, at least in part, the category type of the machine-learned data set, and obtains a second machine-learned skill of the second device, where the first and second machine-learned skills are different machine-learned skills or different machine-learned skill levels, and providing the machine-learned data set of the first device to the second device augments the second device with the first machine-learned skill of the first device.

In certain embodiments of the present invention, the machine-learned data set of the first device is one machine-learned data set of the first device of multiple machine-learned data sets of the first device. Further, in one or more embodiments, the first device is a first machine-learning device, the second device is a second machine-learning device, and the first machine-learning device and the second machine-learning device are a same or similar type of machine-learning device. In one or more other embodiments, the first device is a first machine-learning device, the second device is a second machine-learning device, and the first machine-learning device and the second machine-learning device are different types of machine-learning devices.

In certain embodiments of the present invention, program code executing on one or more processors obtains another machine-learned data set of a third device (i.e., a third machine-learning device), where the other machine-learned data set of the third device is, for instance, additional, categorized machine-learned information, and determines one or more device hardware requirements to use the other machine-learned data set of the third device. Embodiments of the present invention further include program code executing on the one or more processors that, based on receiving a request to provide the other machine-learned data set of the third device to the second device, determines whether the second device meets the one or more device hardware requirements to use the other machine-learned data set of the third device. Embodiments of the present invention also include program code executing on the one or more processors that, based on determining that the second device meets the one or more device hardware requirements, provides the other machine-learned data set of the third device to the second device to provide the additional machine-learned information of the third device to the second device for use by the second device.

In one embodiment, the machine-learned information of the first device and the additional machine-learned information of the third device can be used in combination by the second device to perform a combination skill using both the machine-learned data set of the first device and the other machine-learned data set of the third device.

In one or more embodiments of the present invention, program code executing on the one or more processors obtains an indication of an authorization by a user of the first device to provide the machine-learned information on the first device to the second device, and provides the machine-learned data set of the first device to the second device based, at least in part, on obtaining the indication of authorization by the user of the first device to allow the providing of the machine-learned information of the first device to the second device.

In one embodiment, a user of the first device is also the user of the second device, while in one or more other embodiments, the user of the first device is different from the user of the second device. Note in this regard, that in this context, the user can refer to the owner, operator, licensor, licensee, or other individual or entity that has control of the machine-learning device (e.g., cognitive device) at issue.

Embodiments of the present invention are inextricably tied to computing and provide significantly more than existing approaches to machine-learning. For instance, embodiments of the present invention provide program code executing on one or more processors to exploit the interconnectivity of various systems, as well as to utilize various computing-centric data analysis and handling techniques, in order to obtain a machine-learned data set of a first device, determine device hardware requirements to use the machine-learned data set, determine that a second device has the device hardware requirements, and to provide the machine-learned data set of the first device to the second device to provide machine-learned information of the first device to the second device for use by the second device. Both the interconnectivity of the devices and/or computing systems utilized and the computer-exclusive data processing techniques utilized by the program code enable various aspects of the present invention. Further, embodiments of the present invention provide significantly more functionality than existing approaches to machine-learning by allowing the sharing or transfer of a machine-learned data set of a first device to a second device, which advantageously provides the second device with an additional machine-learned skill of the first device, or enhances an existing machine-learned skill of the second device.

In embodiments of the present invention, the program code provides significantly more functionality, including but not limited to: 1) program code the obtains a machine-learned data set of a first device, where the machine-learned of the first device is categorized machine-learned information; 2) program code that determines one or more device hardware requirements to use the machine-learned data set of the first device; 3) program code that determines, based on receiving a request to provide the machine-learned data set of the first device to a second device, whether the second device meets the one or more device hardware requirements to use the machine-learned data set of the first device; and 4) program code that, based on determining that the second device meets the one or more device hardware requirements, provides the categorized machine-learned information of the first device to the second device for use by the second device.

Devices with machine-learning capabilities are becoming increasingly prevalent in the marketplace. It is desirable that as these devices advance in functionality and everyday use, that continued enhancements in using machine-learned data are provided to improve device performance and provide competitive advantage. For instance, Internet of Things (IoT) connected devices are becoming increasingly prevalent. As these devices advance in functionality in everyday usage, it is desirable to capture machine-learned data that improves device performance. Many devices available today include a machine-learning module that "learns" how to be more efficient, helping the device improve over time. Thus, over time, instead of losing value, a machine-learning device can actually increase in value to the user, since the device can improve its performance over time. For instance, a device can improve over time by learning based on experience in operation within an environment and/or with a particular user, which is learned information that, as described herein, can be categorized and shared with one or more other devices, either owned or used by the same user, or different users.

As known in the art, machine-learning applies statistical learning techniques to automatically identify patterns of data. One of the more common methods used is tree analysis. In machine-learning, a tree(s) can grow exponentially based on the dimensions (categories, features, etc.) and forks (if/then statements) used. Generally, the larger the tree, the higher the accuracy of the device or machine-learning system. Operation of a machine-learning module of a device results in data, for instance, training data or machine-learned data that the machine-learning created. When the machine-learned data is combined with artificial intelligence, machine-learning computing is provided. Depending on the device capabilities, sharing or transferring a machine-learned data set such as disclosed herein can result in sharing of a machine-learned skill level (i.e., a machine-learning level), or sharing of a machine-learned cognitive learning level (by adding an artificial intelligence layer).

FIG. 1 depicts one embodiment of a workflow or process illustrating one or more aspects of some embodiments of the present invention. In one or more embodiments of the present invention, program code executing one or more processors obtains a machine-learned data set of a first device, where the machine-learned data set of the first device is machine-learned information (such as categorized machine-learned information) 100. For instance, the machine-learned data set of the first device can relate to or be associated with a machine-learned skill, or skill level. Program code executing on the one or more processors determines one or more device hardware requirements to use the machine-learned data set of the first device 110. Based on receiving a request to provide the machine-learned data set of the first device to a second device, program code executing on the one or more processors determines whether the second device meets the one or more device hardware requirements to use the machine-learned data set of the first device 120. Based on determining that the second device meets the one or more device hardware requirements, the program code executing on the one or more processors provides the machine-learned data set of the first device to the second device to provide the machine-learned information of the first device to the second device for use by the second device 130.

The above-noted process can be used in a variety of applications, including applications such as described herein.

In one or more embodiments, a machine-learned data set or skill level is obtained by a first (source) device, such as machine-learned training data, decision trees, forks, dimensions, predictions, assumptions, etc., which can be transferred to a second (target) device, that is either used by the same user as the first device, or by a different user. Note that transfer of a machine-learned data set as described herein is specific to a particular machine-learned data set, skill or capability, without transferring information (such as a user profile) associated with the user of the device.

In one or more embodiments, the same user as the first device, or a different user, can use the second device, and have an option to load a machine-learned data set (or, depending on the devices, a machine-learning level) generated from a user's prior usage of the first device. Thus, the system can have the option to import or export machine-learned data sets, or skill levels, and/or machine-learning levels of one or more devices, such as one or more Internet of Things (IoT) devices.

Further, the system can load a plurality of machine-learned data sets (e.g., machine-learned skill levels) from a plurality of devices onto a single device to create, for instance, a crowd-sourced, machine-learned data set or a crowd-sourced, machine-learned skill level. As explained herein, the plurality of source devices can be of a same or similar type of device as the target device, or different. For instance, in one or more embodiments, a first robotic arm (first device) can provide a first machine-learned data set (e.g., a first machine-learned skill level), a second robotic arm (second device) can provide a second machine-learned data set (e.g., a second machine-learned skill level), and a third robotic arm (third device) can provide a third machine-learned data set (e.g., a third machine-learned skill level) to a target robotic arm (i.e., a fourth device) to provide the fourth device with a crowd-sourced, machine-learned data set, a crowd-sourced, additional machine-learned skill level, and/or a crowd-sourced, enhanced machine-learned skill level.

Figure 2:
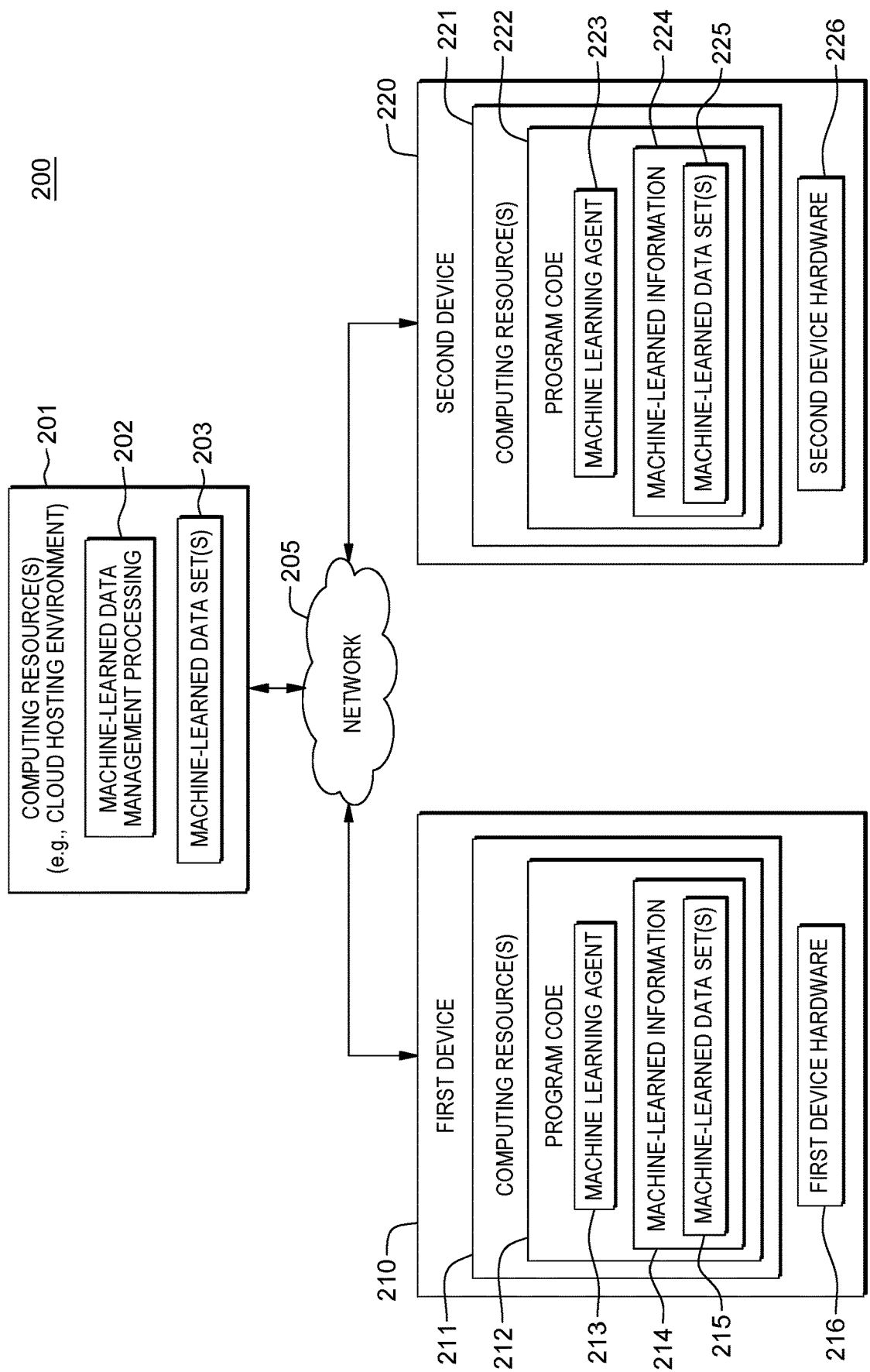
FIG. 2 depicts one embodiment of a system, illustrating certain aspects of an embodiment of the present invention.

FIG. 2 depicts one embodiment of a system 200, illustrating certain aspects of an embodiment of the present invention. System 200 includes various computing devices, including one or more computing resources 201, a first device 210, and a second device 220. First device 210 includes computing resource(s) 211 that execute program code 212 that generates or updates an operational model or skill model used by first device 210 based on machine-learning (e.g., via a cognitive and/or machine-learning agent 213). First device 210 utilizes the model to perform one or more skills, actions, operations, functions, etc., (herein referred to as skills). In one or more implementations, the model can be resident on first device 210 or, in one or more other embodiments, on computing resource(s) 201, which in one implementation, could be a cloud hosting environment. In the system of FIG. 2, machine-learned information 214 (such as categorized machine-learned information) is obtained, including one or more machine-learned data sets 215, such as described herein. Further, first device includes first device hardware 216 used by program code 212 to perform one or more skills, in accordance with the model.

Similarly, second device 220 includes computing resource(s) 221 that executes program code 222 that generates or updates its own operational model or skill model used by second device 220, based on machine-learning (e.g., by a cognitive and/or machine-learning agent 223). Second device 220 utilizes the model to perform one or more skills. In one or more implementations, the model can be resident on second device 220, or in one or more other embodiments, on computing resource(s) 201, such as a cloud-based hosting environment. As with first device 210, machine-learned information 214 (such as categorized machine-learned information) is obtained by second device, including one or more machine-learned data sets 225, such as described herein. Further, second device includes second device hardware 226 used by program code 222 to perform the one or more skills, in accordance with the operational or skill model used by second device 220. Note that although described herein with reference to providing or transferring a machine-learned data set from first device 210 to second device 220, that the concepts disclosed herein similarly apply to also transferring one or more machine-learned data sets of second device 220 to first device 210, where desired.

In one or more implementations, computing resource(s) 201 can also include program code executing on one or more processors to implement a machine-learned data management process 202, such as described herein, and can store in one or more databases, user-associated, machine-learned data sets 203 from one or more devices, including, for instance, from first device 210 and/or second device 220, as well as other devices (not shown). Note also that although shown in FIG. 2 as residing on computing resource(s) 201, machine-learned data management processing 202 can be distributed within system 200, for instance, with one or more aspects of machine-learned data management processing 202 resident on first device 210 and/or second device 220, or the machine-learned data management processing 202 fully resident within first device 210 and/or second device 220, depending on the implementation.

By way of example only, system 200 includes, or utilizes, one or more networks 205 for interfacing various aspects of computing resource(s) 211 of first device 210, computing resource(s) 221 of second device 220, and/or computing resource(s) 201, including machine-learned data management processing 202. By way of example, network(s) 205 can be, for instance, a telecommunications network, a local area network (LAN), a wide area network (WAN), such as the Internet, or a combination thereof, and can include wired, wireless, fiber optic connections, etc. The network(s) can include one or more wired and/or wireless networks that are capable of receiving and transmitting data, including machine-learned data sets, such as discussed herein.

In one or more implementations, computing resource(s) 211, computing resource(s) 221, and/or computing resource(s) 201 of system 200 houses and/or executes program code configured to perform methods in accordance with one or more aspects of the present invention. By way of example, computing resource(s) 211 of first device 210, as well as computing resource(s) 221 of second device 220 can be a server or other computing-system-implemented resource(s) that is, in one or more embodiments, integrated, in whole or part, into the respective device(s). Further, for illustrative purposes only, computing resource(s) 201 in FIG. 2 is depicted as being separate from first device 210 and second device 220. This is a non-limiting example of an implementation. In one or more other implementations, computing resource(s) 201 on which one or more aspects of machine-learned data management processing 202 is implemented could, at least in part, be located within first device 210 and/or within second device 220.

Briefly described, in one embodiment, computing resource(s) 211, computing resource(s) 221, and/or computing resource(s) 201 can each include one or more processors, for instance, central processing units (CPUs). Also, the processor(s) can include functional components used in the integration of program code, such as functional components to fetch program code from locations such as cache or main memory, decode program code, and execute program code, access memory for instruction execution, and write results of the executed instructions or code. The processor(s) can also include a register(s) to be used by one or more of the functional components. In one or more embodiments, the computing resource(s) can include memory, input/output, a network interface, and storage, which can include and/or access one or more other computing resources and/or databases as required to implement the machine-learned data management processing described herein. The components of the respective computing resource(s) can be coupled to each other via one or more buses and/or other connections. Bus connections can be one or more of any of several types of bus structures, including a memory bus or a memory controller, a peripheral bus, an accelerated graphics port, and a processor or local bus, using any of a variety of architectures. By way of example, and not limitation, such architectures can include the industry standard architecture (ISA), the micro-channel architecture (MCA), the enhanced ISA (EISA), the video electronic standard association (VESA), local bus, and peripheral component interconnect (PCI). Examples of a computing resource(s) or computer system(s) which can implement one or more aspects disclosed herein are described further below with reference to FIGS. 10-12. Note also that, depending on the implementation, one or more aspects of each computing resource 211, 221, 201, can be associated with, licensed by, subscribed to by, etc., a company or organization operating, owning, etc., first device 210 and/or second device 220.

As noted, program code 212 executing on computing resource(s) 211 of first device 210 executes a machine-learning agent 213 to obtain machine-learned information 214, such as one or more machine-learned data sets 215. The machine-learned information 214, including machine-learned data set(s) 215 includes data obtained by program code 212 during end-user use of first device 210, which can represent enhancements to the operational model of first device 210, such as providing first device 210 with a learned skill, or how to be more efficient at an existing skill, etc., such that operation of first device 210 improves over time. In one or more implementations, first device 210 includes a set of first device hardware components 216 such as, for instance, one or more of image recognition components, voice recognition components, natural language processing components, robotic action components, conversation service components, etc., to perform, for instance, the particular machine-learned skill(s) represented or provided by the machine-learned data set(s).

Similarly, program code 222 executing on computing resource(s) 221 of second device 220 executes machine-learning agent 223 to obtain machine-learned information 224, such as one or more machine-learned data sets 225. The machine-learned information 224, including machine-learned data set(s) 225 includes data obtained by program code 222 during end-user use of second device 220, which can represent enhancements to the operation or skill model of second device 220, such as providing second device 220 with a learned skill, or how to be more efficient at an existing skill, etc., such that operation of second device 220 improves over time. In one or more implementations, second device 220 also includes a set of first device hardware components 226 to perform, at least, the one or more particular skills for which second device is designed, such as, for instance, one or more of image recognition components, voice recognition components, natural language processing components, robotic action components, conversation service components, etc.

In operation, machine-learning agent 213 obtains data from end-user operation of first device 210 to continually learn (in one embodiment) and update the patterns that form the model used by first device 210. In one or more embodiments, the data can include a variety of types of data, depending on the model and/or operational skill(s) of the first device. As noted, in some embodiments, program code 212 executing on one or more computing resources 211 applies machine-learning algorithms of machine-learning agent 213 to generate and train the model, which the program code then utilizes to perform the skill (e.g., task, action, etc.) at issue. In an initialization or learning stage, program code 212 can train the algorithm(s) based on patterns for a given user of first device 210.

Figure 3:
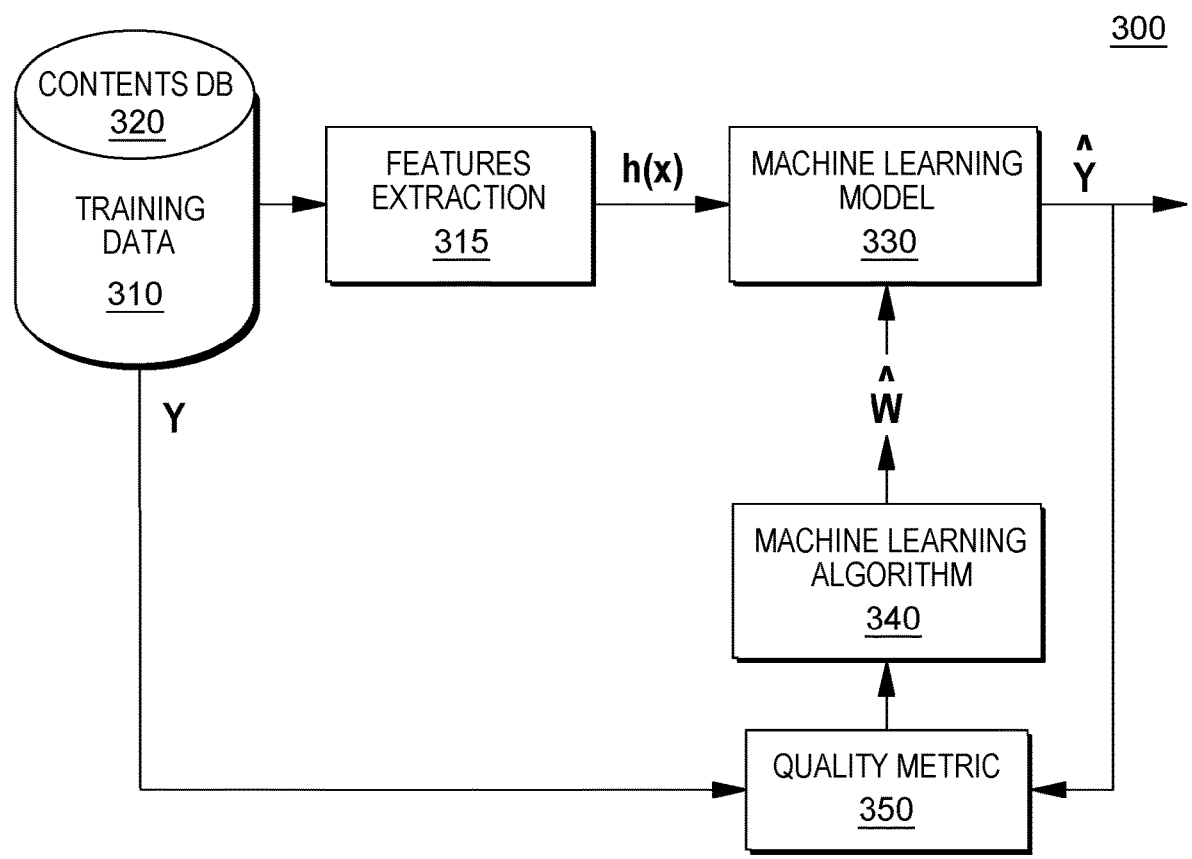
FIG. 3 illustrates various aspects of some embodiments of the present invention.

FIG. 3 is an example machine-learning training system 300 that can be utilized to perform machine-learning, such as described herein. Training data 310 used to train the model in embodiments of the present invention can include a variety of types of data, such as data generated by the respective machine-learning device. Program code, in embodiments of the present invention, can perform machine-learning analysis to generate data structures, including algorithms utilized by the program code to perform a machine-learned skill, function, action, etc. Machine-learning (ML) solves problems that cannot be solved by numerical means alone. In this ML-based example, program code extracts various features/attributes from training data 310, which can be stored in memory or one or more databases 320. The extracted features 315 are utilized to develop a predictor function, h(x), also referred to as a hypothesis, which the program code utilizes as a machine-learning model 330. In identifying machine-learning model 330, various techniques can be used to select features (elements, patterns, attributes, etc.), including but not limited to, diffusion mapping, principle component analysis, recursive feature elimination (a brute force approach to selecting features), and/or a random forest, to select the attributes related to enhanced performance of a machine-learned skill implemented by the device. Program code can utilize a machine-learning algorithm 340 to train machine-learning model 330 (e.g., the algorithms utilized by the program code), including providing weights for conclusions, so that the program code can train any predictor or performance functions included in the machine-learning model 340. The conclusions can be evaluated by a quality metric 350. By selecting a diverse set of training data 310, the program code trains the machine-learning model 340 to identify and weight various attributes (e.g., features, patterns) that correlate to enhance performance of the machine-learned skill implemented by the device.

The model used by each respective device can be self-learning, as program code updates the model based on feedback received during performance of the respective device skill (e.g., action, function, etc.). For instance, where first device 210 in FIG. 2 identifies spoiled produce, the device learns over time to more accurately identify and select produce that has spoiled.

In some embodiments of the present invention, the program code executing on the respective computing resource(s) of system 200 utilizes existing machine-learning analysis tools or agents to create, and tune, each respective model, based, for instance, on data obtained, either directly from the respective device, or transferred to the respective device by a machine-learned data management processing 202, with processing capability such as described herein.

Some embodiments of the present invention can utilize IBM Watson® as learning agent. IBM Watson® is a registered trademark of International Business Machines Corporation, Armonk, N.Y., USA. In embodiments of the present invention, the respective program code can interface with IBM Watson application programming interfaces (APIs) to perform machine-learning analysis of obtained data. In some embodiments of the present invention, the respective program code can interface with the application programming interfaces (APIs) that are part of a known machine-learning agent, such as the IBM Watson® application programming interface (API), a product of International Business Machines Corporation, to determine impacts of data on an operational model, and to update the respective model, accordingly.

In some embodiments of the present invention, certain of the APIs of the IBM Watson API include a machine-learning agent (e.g., learning agent) that includes one or more programs, including, but not limited to, natural language classifiers, Retrieve-and-Rank (i.e., a service available through the IBM Watson® developer cloud that can surface most-relevant information from a collection of documents), concepts/visualization insights, tradeoff analytics, document conversion, natural language processing, and/or relationship extraction. In an embodiment of the present invention, one or more programs can be provided to analyze data obtained by the program code across various sources utilizing one or more of, for instance, a natural language classifier, Retrieve-and-Rank APIs, and tradeoff analytics APIs. In operation, the program code can collect and save machine-learned data sets 215 used by machine-learning agent 213. These data sets can be retained at the individual device, or depending on the implementation, forwarded to a central computing resource(s) 201 of system 200 for, for instance, saving in a file associated with the user of the device generating the machine-learned data set(s).

In some embodiments of the present invention, the program code utilizes a neural network to analyze collected data relative to a user to generate the operational model for a device. Neural networks are a programming paradigm which enable a computer to learn from observational data. This learning is referred to as deep learning, which is a set of techniques for learning in neural networks. Neural networks, including modular neural networks, are capable of pattern (e.g., state) recognition with speed, accuracy, and efficiency, in situations where data sets are multiple and expansive, including across a distributed network, including but not limited to, cloud computing systems. Modern neural networks are non-linear statistical data modeling tools. They are usually used to model complex relationships between inputs and outputs, or to identify patterns (e.g., states) in data (i.e., neural networks are non-linear statistical data modeling or decision making tools). In general, program code utilizing neural networks can model complex relationships between inputs and outputs and identify patterns in data. Because of the speed and efficiency of neural networks, especially when parsing multiple complex data sets, neural networks and deep learning provide solutions to many problems in multi-source processing, which the program code, in embodiments of the present invention, can accomplish when managing machine-learned data sets between devices.

Figure 4:
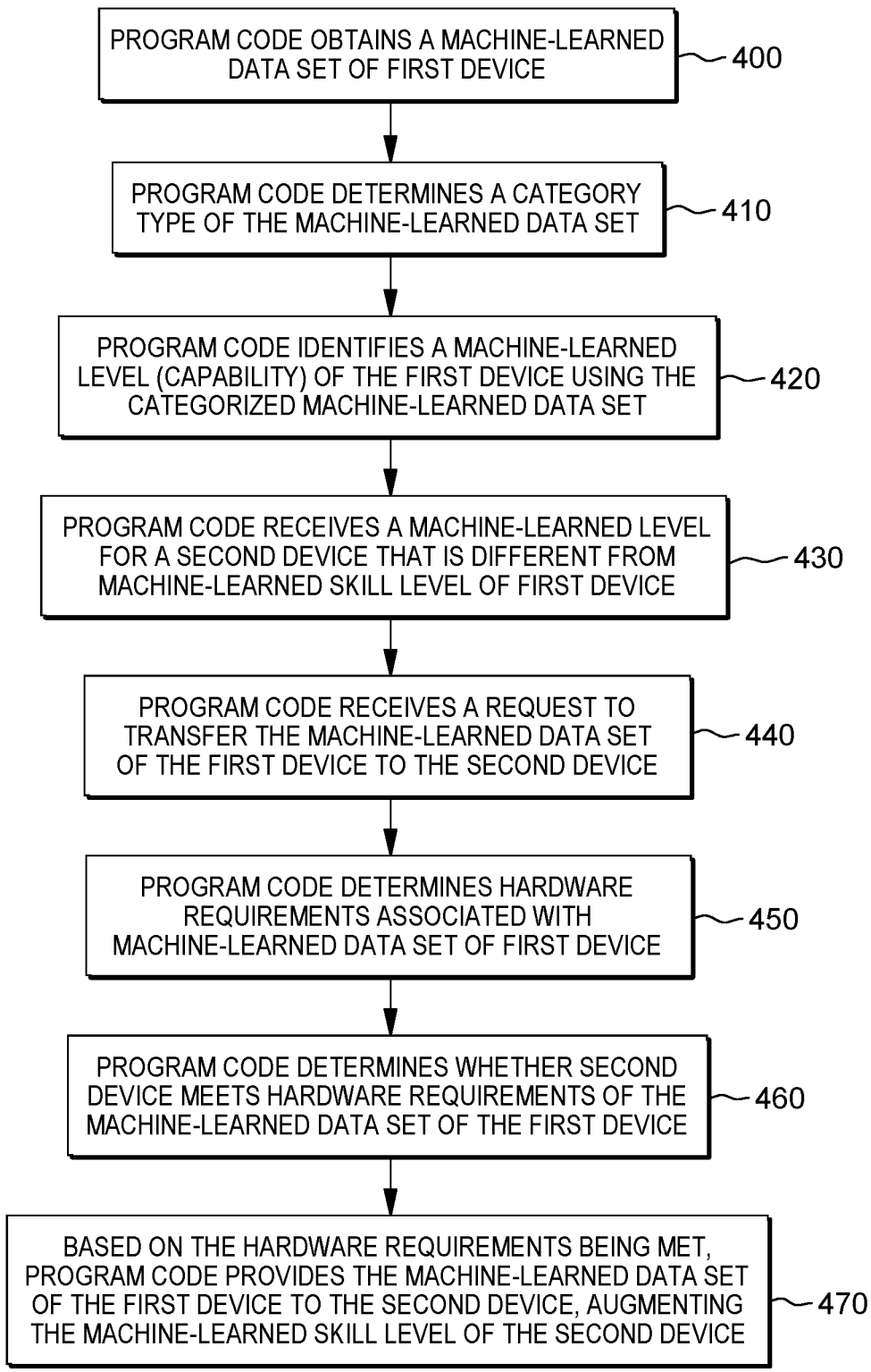
FIG. 4 is a further workflow that illustrates certain aspects of some embodiments of the present invention.
Figure 5:
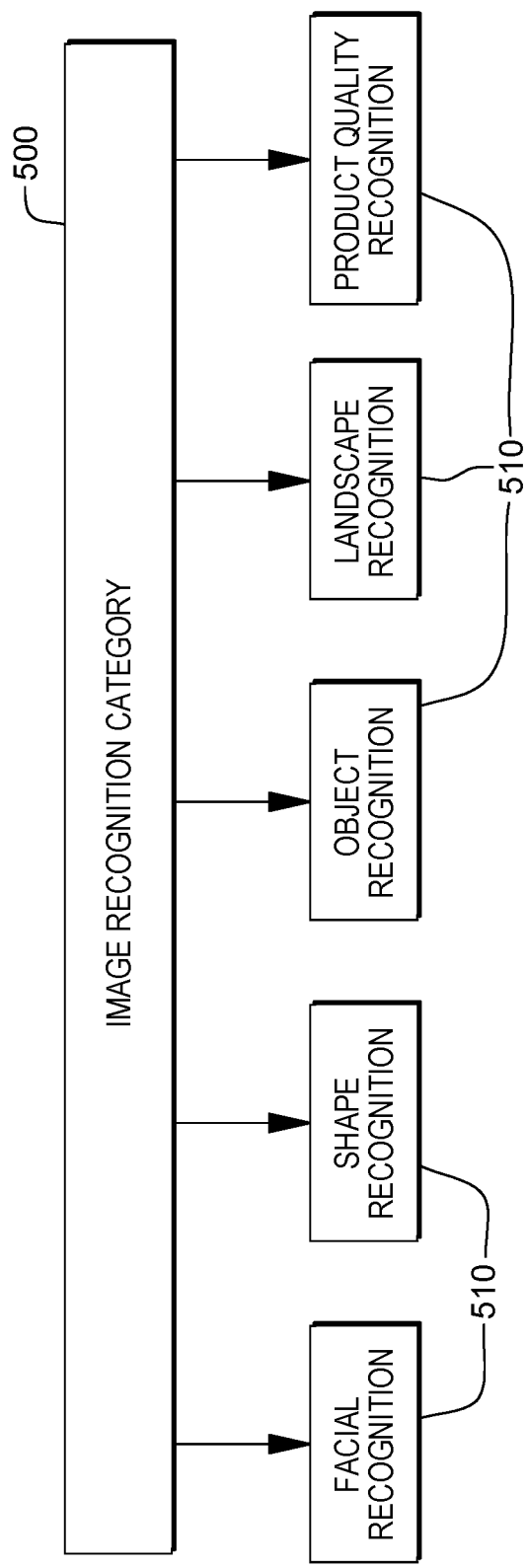
FIG. 5 depicts an embodiment of a category type and sub-categories of machine-learned data, according to one or more embodiments of the present invention.

FIG. 4 depicts a more detailed embodiment of a process in accordance with one or more aspects of the present invention. In this embodiment, program code executing on one or more processors obtains a machine-learned data set of a first device 400, and determines a category type of the machine-learned data set 410. For instance, the system categorizes machine-learned data into one of a plurality of different category types of machine-learned data, such as visual or image recognition data, voice recognition data, natural language processing data, sequence of actions data, robotics data, conversation services data, etc., and one or more of these categories can have associated data sets or sub-categories, such as depicted in the example of FIG. 5, discussed below. In one or more embodiments, categorizing the machine-learned data can include program code executing on one or more processors identifying where the machine-learned data originated, that is, which hardware components of the machine-learning device provided the machine-learned data, and categorizing the machine-learned data can include, for instance, grouping or flagging the machine-learned data into machine-learned data sets based on category type, in a manner which allows the device or system to subsequently retrieve the machine-learned data set, as described here. Further, note that in one or more embodiments, the machine-learned data is open system data, such as XML data that can be readily transferred between different device types, if desired.

Program code executing on the one or more processors identifies a machine-learned level (capability) of the first device using the categorized, machine-learned data set 420. Further, the program code receives a machine-learned level for a second device that is, for instance, different from the first machine-learned skill level of the first device 430.

In one or more implementations, the program code executing on the one or more processors receives a request to transfer the machine-learned data set of the first device to the second device 440, and based on receiving the request, determines device hardware requirements associated with the machine-learned data set of the first device 450. For instance, where the machine-learned data set relates to image recognition, and in particular to object recognition, then the device hardware requirements for use of the machine-learned data would include the appropriate image recognition hardware components or resources on the second device. The program code determines whether the second device meets the device hardware requirements to use the machine-learned data set of the first device 460. Based on the device hardware requirements being met, the program code executing on the one or more processors provides the machine-learned data set of the first device to the second device, augmenting the machine-learned skill level of the second device 470.

By way of example, as illustrated in FIG. 5, one category type can be an image recognition category 500, which has multiple sub-categories 510, such as one or more data sets relating to facial recognition, shape recognition, object recognition, landscape recognition, product quality recognition, etc., that are available to and/or used by a particular end-user device, either alone or in combination, to perform a particular skill (e.g., task, function, action, etc.). For instance, to perform a particular skill, a robotic device can use device capabilities in a combination of categories and sub-categories (or data sets).

Figure 6:
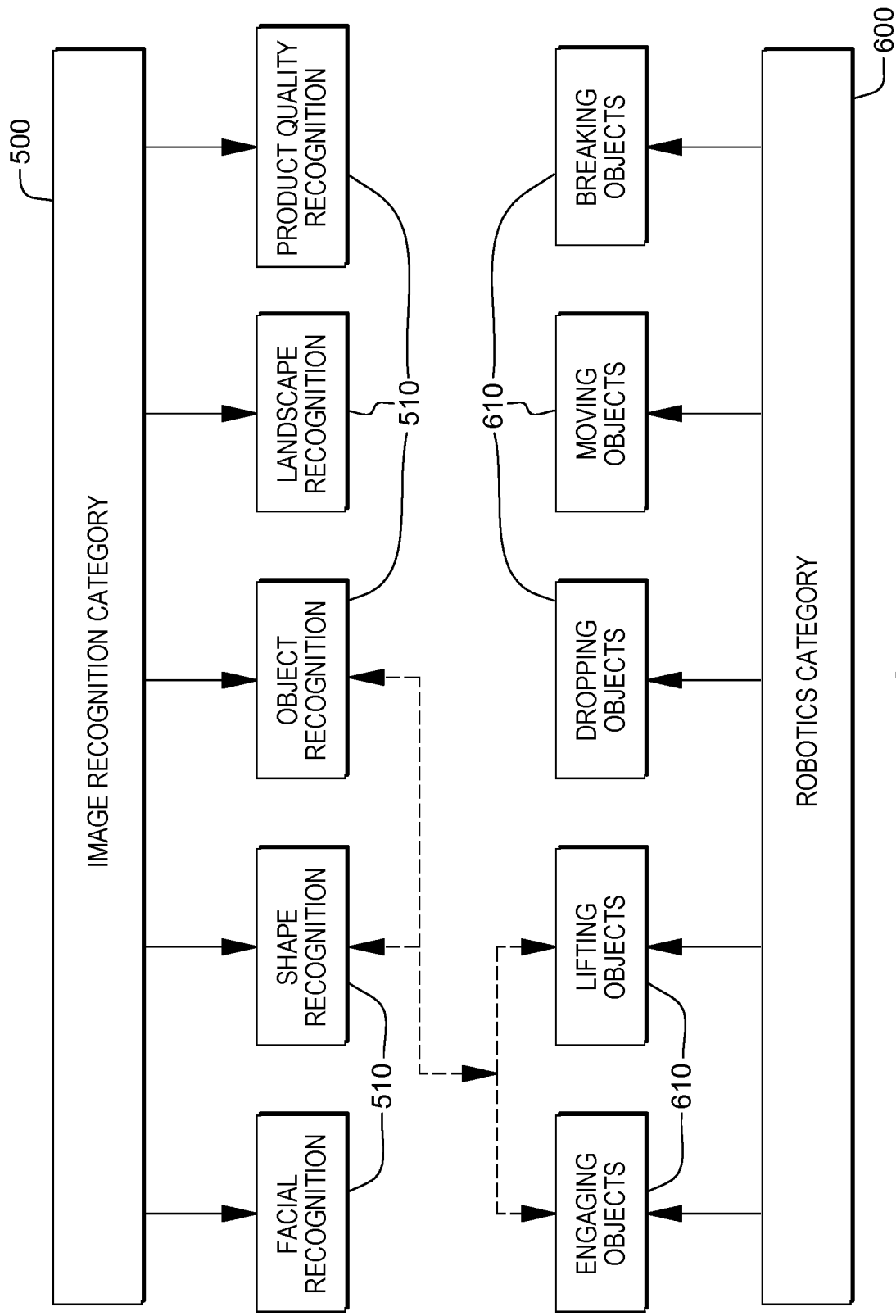
FIG. 6 depicts multiple category types and sub-categories of machine-learned data associated with a device task or machine-learned skill that can be managed between devices, in accordance with one or more aspects of some embodiments of the present invention.

For example, a robotic device can be trained to perform a skill or task that includes engaging an object, understanding the shape of the object, determining what the object is, and placing the object in an appropriate container. As illustrated in FIG. 6, this skill or task of the robotic device can include multiple category types, including, image recognition category 500, as well as a robotics category 600, and multiple sub-categories, including, for instance, shape recognition and object recognition sub-categories 510 of image recognition category 500, and multiple robotic sub-categories 610, including, for instance, one or more of an engaging objects sub-category (or data set), a lifting objects sub-category, dropping objects sub-category, moving objects sub-category, and/or breaking objects sub-category. In implementation, the particular skill or task implemented by the device can include one or more category types, and one or more sub-categories or data sets of the category types. Depending on the device, there can be many possible combinations of data sets used to achieve a particular skill or task. As described herein, an object of the present invention is to be able to share machine-learned data sets or skills acquired during an end-user's use of a device across devices, where appropriate, based on available hardware components or resources.

Figure 7:
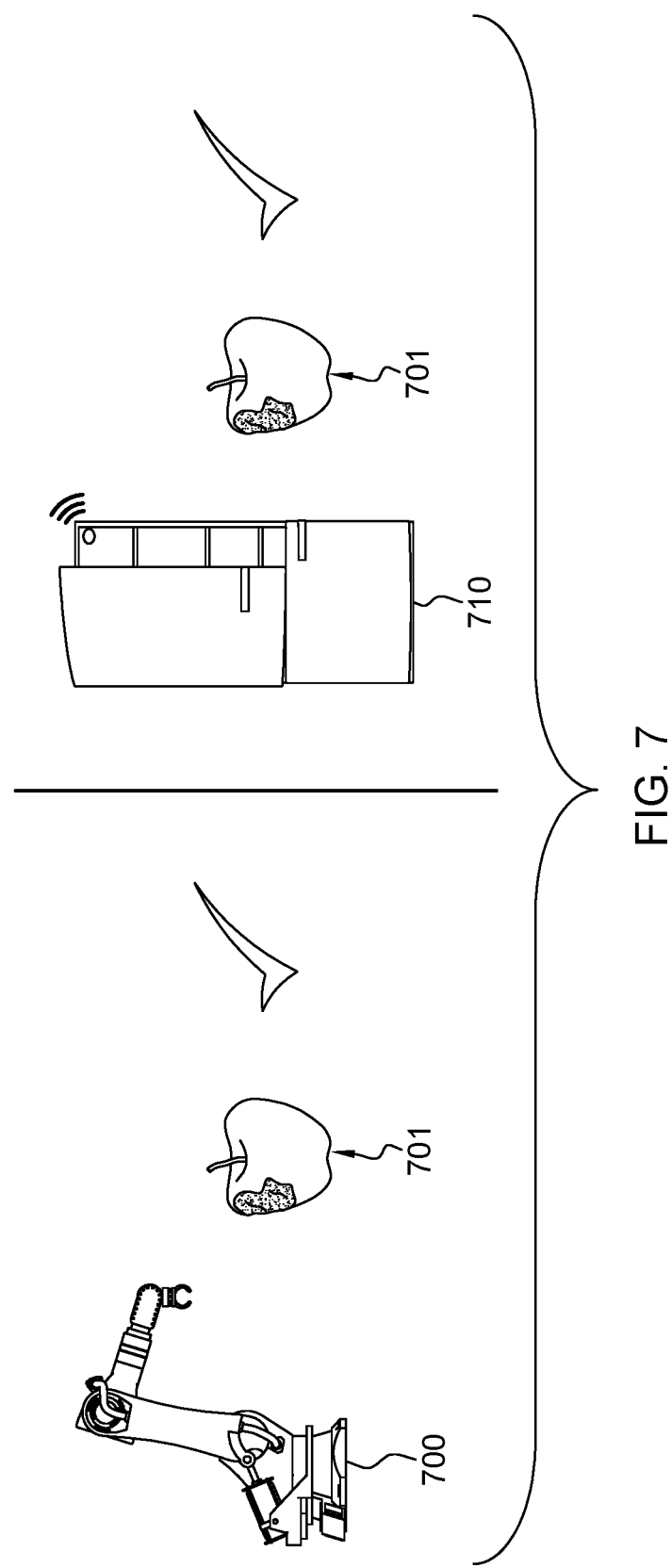
FIG. 7 depicts one embodiment of providing a machine-learned data set of a first device to a second device for use by the second device, according to one or more aspects of the present invention.

FIG. 7 depicts an operational example of a machine-learned data management process or facility disclosed herein. In FIG. 7, a first device, robotic arm 700, is trained to recognize spoiled produce 701 based, for instance, on shape recognition and object recognition. As part of this process, robotic arm 700 uses a machine-learned data set obtained over time. A second device, such as a smart refrigerator 710, includes an imaging device, such as a camera, with image recognition capabilities, but is currently programmed to only recognize whether sufficient milk is available in the refrigerator. With the machine-learned data management facility disclosed herein, the machine-learned data set of robotic arm 700 can be provided to smart refrigerator 710 to recognize spoiled produce 701, so that the smart refrigerator receives, in this example, an additional machine-learned skill by receiving the machine-learned data set from the robotic arm.

Providing the machine-learned data set of a first device to a second device can include, in one or more embodiments, exporting the data set from the first device. In one embodiment, when exporting a data set, the system determines the hardware required to effectively use the machine-learned data set(s) of the first device. For instance, for an image recognition data set(s), a camera is required, for sound recognition data sets, an audio recording device is required, etc. Similarly, when importing a machine-learned data set(s), the system checks the requirements of the data set(s) to ensure that the second device has the required hardware components or resources. If requirements are not met, then the system can provide an error, and not import the machine-learned data set(s) of the first device to the second device. For instance, importing a data set of robotics to an object without robotics capabilities (e.g., a refrigerator, static IoT device, etc.) would result in a process error being generated.

As noted herein, a system user can import a plurality of machine-learned data sets from different devices into a single device to perform, for instance, an additional machine-learned skill, or to enhance an existing machine-learned skill of the device. For instance, in one implementation, robotic capabilities from a robotic arm, such as catching an object in the air, can be obtained by extracting the relevant, categorized machine-learned data set of the robotic arm, and machine-learned image recognition capabilities can be extracted from, for instance, a refrigerator that recognizes produce. By importing these two differently categorized data sets from two different devices, into a new robotic device, such as a robotic toy, the toy can, for instance, catch any produce thrown at it; that is, assuming that the toy has the necessary hardware components or resources.

Note that the machine-learned data management process or facility disclosed herein can be based, in one or more embodiments, on creating the machine-learned data sets or packages using a standard open file system, which enables the distribution of machine-learned data, or machine-learning levels, regardless of the different types or brands of devices. Thus, machine-learned data can be managed between, for instance, IoT devices with different vendors and/or models.

In one or more embodiments, machine-learned data of a device can be used or associated with a particular end-user or group of end-users. In such embodiments, there might be a plurality of machine-learned levels, and depending on the user, context, location, situation, etc., the device can be provided or uploaded with the appropriate machine-learned data set(s). For instance, a first driver might have a first machine-learning level associated with a family vehicle (i.e., machine-learning device), while other members of the family might have a different machine-learning level associated with the vehicle, with the same device being provided with the appropriate one of the data sets, depending on the user context, location, situation, etc., with which the vehicle is to be currently used.

Those skilled in the art will note from the description provided herein that user profiles are not being shared between devices. In particular, a user profile, such as a set of characteristics inherited from an owner, such as name, age, address, ID, phone number, experience level, etc., are not being transferred as part of a machine-learned data set obtained from a first device and provided to a second device. In particular, the complete capabilities of the first device are not being provided to the second device based on the machine-learned data management process disclosed herein. Thus, a user can share, for instance, a cognitive level achieved on a given device through the user's use of the device, without sharing the user's entire account. This facilitates maintaining user privacy, and makes the data management disclosed herein more secure.

In one or more embodiments, the user of the first and second device can be different users, and, as noted above, can be different types of devices, or similar types of devices. For instance, where the first and second devices are a same or similar type robotic toy, the machine-learned data management facility disclosed herein can be employed to transfer one or more machine-learned capabilities or skills of the first device to the second device.

In one or more implementations, when renting a device, a user may want to have a "mature device", meaning that the device has higher machine-learning skills available (based on prior usage) than a less mature device, which can, for instance, result in better performance for the user with the more mature device. In such an implementation, different costs could be associated with the different learning levels for the device, if desired.

Figure 8:
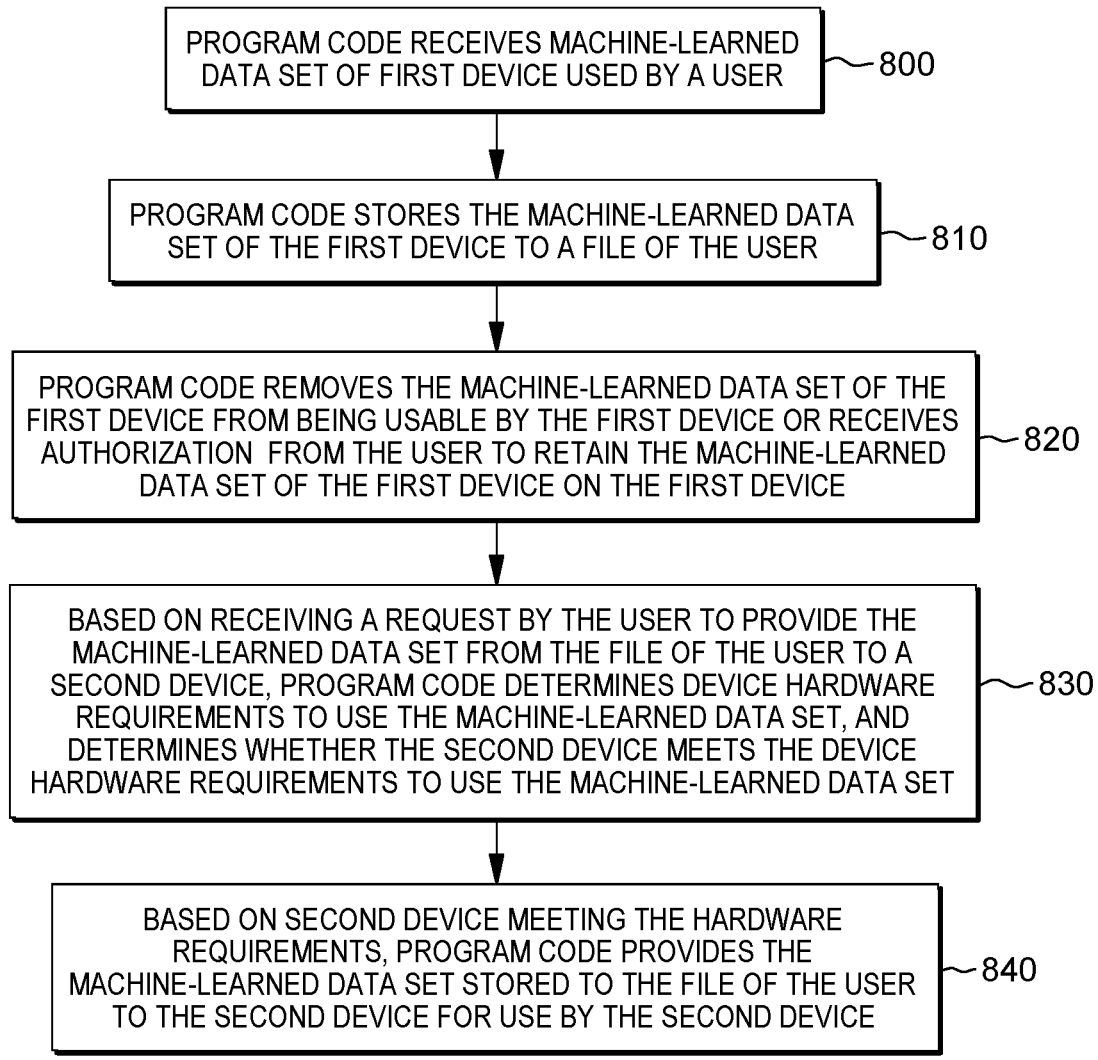
FIG. 8 depicts another workflow that illustrates certain aspects of one or more embodiments of the present invention.

FIG. 8 depicts a further embodiment of a process illustrating certain aspects of one or more embodiments of the present invention. In the machine-learned data management process of FIG. 8, program code executing on one or more processors receives a machine-learned data set of a first device used by a user 800. In this embodiment, the program code can store the machine-learned data set of the first device to a file of the user 810, such as to a file of a central system implementing the machine-learned data management process. Program code executing on one or more processors removes the machine-learned data of the first device from being usable by the first device, or receives authorization from the user to retain the machine-learned data set of the first device on the first device 820. In this example, the user has control of the data learned by the first device based on the experience acquired during the user's usage of the device. For instance, a user can be renting the first device, beginning with a machine-learning level or cognitive level of zero, and after three months of use, the machine-learning level or cognitive level might be a level 6, implying a greater performance level based on the user's usage of the device.

In accordance with the process of FIG. 8, the user of the first device decides whether and how the machine-learned data set obtained during the user's use of the device is to be used. The user has, for instance, an option to share the acquired information, in this example, the machine-learning level 6, or to maintain the machine-learned data in the user's data file. Where the user wants to maintain the machine-learned data without sharing, then when the first device is, for instance, returned from a lease, the machine-learning level (or cognitive level) of the device is reset back to, for instance, a machine-learning level zero, and the machine-learning level obtained by the device while used by the user is retained or saved in association with the user's profile, for instance, for the user's personal usage in the future on another device.

Based on receiving a request by the user to provide the machine-learned data set from the file of the user to a second device, program code executing on one or more processors determines device hardware requirements to use the machine-learned data set, and determines whether the second device meets the device hardware requirements to use the machine-learned data set 830. Based on the second device meeting the hardware requirements, program code provides the machine-learned data set(s), retrieved from the file of the user, to the second device for use by the second device 840.

In one or more implementations, the user could have an option to monetize the machine-learned data or cognitive level acquired by the device during the user's usage of the device and, for instance, share that machine-learned data with the device rental company. Such a feature would enable a new business model, where the renting company can provide an incentive to the user to share the machine-learned data gathered by the device, in which case, the renting company can rent smarter devices (with different machine-learning or cognitive levels at different prices), giving users of the device different options, such as a premium option to rent a smarter (probably more efficient) device, again depending on the type of device and skill at issue.

Figure 9A:
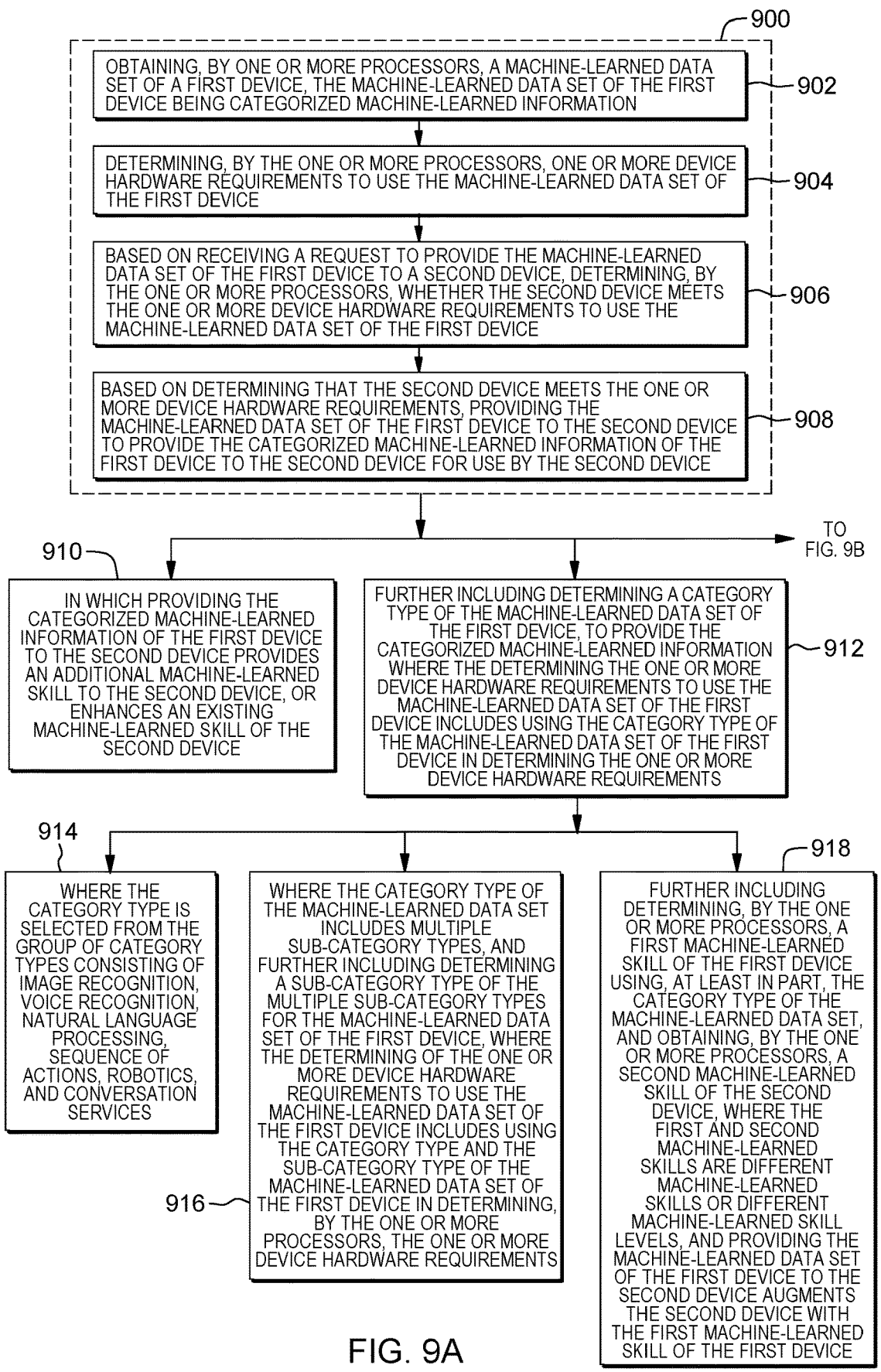

FIGS. 9A-9B depict a further embodiment of program code processing, in accordance with one or more aspects of the present invention.

Referring collectively to FIGS. 9A-9B, program code executing on one or more processors implements a process 900 which includes obtaining, by the one or more processors, a machine-learned data set of a first device, where the machine-learned data set of the first device is categorized machine-learned information 902, and determining, by the one or more processors, one or more device hardware requirements to use the machine-learned data set of the first device 904. Based on receiving a request to provide the machine-learned data set of the first device to a second device, the process includes determining, by the one or more processors, whether the second device meets the one or more device hardware requirements to use the machine-learned data set of the first device 906. Based on determining that the second device meets the one or more device hardware requirements, the machine-learned data set of the first device is provided to the second device to provide the categorized machine-learned information of the first device to the second device for use by the second device 908.

In one or more embodiments, providing the machine-learned information of the first device to the second device provides an additional machine-learned skill to the second device, or enhances an existing machine-learned skill of the second device 910.

In one or more embodiments, the process also includes determining a category type of the machine-learned data set of the first device to provide the categorized machine-learned information, and where determining the one or more device hardware requirements to use the machine-learned data set of the first device includes using the category type of the machine-learned data set of the first device in determining the one or more device hardware requirements 912. In one embodiment, the category type is selected from a group of category types which include, for instance, one or more of image recognition, voice recognition, natural language processing, sequence of actions, robotics, and conversation services 914.

In one or more embodiments, the category type of the machine-learned data set includes multiple sub-category types, and the process further includes determining a sub-category type of the multiple sub-category types for the machine-learned data set of the first device, wherein the determining of the one or more device hardware requirements to use the machine-learned data set of the first device includes using the category type and the sub-category type of the machine-learned data set of the first device in determining, by the one or more processors, the one or more device hardware requirements 916.

In one or more embodiments, the process further includes determining, by the one or more processors, a first machine-learned skill of the first device using, at least in part, the category type of the machine-learned data set, and obtaining, by the one or more processors, a second machine-learned skill of the second device, where the first and second machine-learned skills are different machine-learned skills or different machine-learned skill levels, and providing the machine-learned data set of the first device to the second device augments the second device with the machine-learned skill of the first device 918.

In one embodiment, the machine-learned data set of the first device is one machine-learned data set of the first device of multiple machine-learned data sets of the first device 920. In one or more further embodiments, the first device is a first machine-learning device and the second device is a second machine-learning device, where the first and second machine-learning devices are a same type of machine-learning device 922. In one or more other implementations, the first device is a first machine-learning device and the second device is a second machine-learning device, where the first and second machine-learning devices are different types of machine-learning devices 924.

In one or more embodiments, the process further includes obtaining by the one or more processors, another machine-learned data set of a third device, where the other machine-learned data set of the third device is additional, categorized machine-learned information 926, and determining by the one or more processors, one or more device hardware requirements to use the other machine-learned data set of the third device 928. Based on receiving a request to provide the other machine-learned data set of the third device to the second device, the process includes determining, by the one or more processors, whether the second device meets the one or more device hardware requirements to use the other machine-learned data set of the third device 930. Based on determining that the second device meets the one or more device hardware requirements, the other machine-learned data set of the third device is provided to the second device, to provide the additional, categorized machine-learned information of the third device to the second device for use by the second device 932.

In one or more embodiments, process further includes obtaining, by the one or more processors, an indication of an authorization by a user of the first device to provide the categorized machine-learned information of the first device to the second device, where providing the machine-learned data set of the first device to the second device is based, at least in part, on obtaining the indication of authorization by the user of the first device to allow the providing of the categorized machine-learned information of the first device to the second device 934.

Further exemplary embodiments of a computing environment to implement one or more aspects of the present invention are described below with reference to FIGS. 10-12.

By way of further example, FIG. 10 depicts one embodiment of a computing environment 1000, which includes a computing system 1012. Examples of well-known computing systems, environments, and/or configurations that may be suitable for use with computer system 1012 include, but are not limited to, a server, a desktop computer, a work station, a wireless computer, a handheld or laptop computer or device, a mobile phone, a programmable consumer electronic device, a tablet, a personal digital assistant (PDA), and the like.

Computing system 1012 can be described in the general context of computer system-executable instructions, such as program modules, being executed by a computer system. Generally, program modules include routines, programs, objects, components, logic, data structures, and so on that perform particular tasks or implement particular abstract data types.

As depicted in FIG. 10, computing system 1012, is shown in the form of a general-purpose computing device. The components of computing system 1012 can include, but are not limited to, one or more processors or processing units 1016, a system memory 1023, and a bus 1018 that couples various system components including system memory 1023 to processor 1016.

In one embodiment, processor 1016 may be based on the z/Architecture® offered by International Business Machines Corporation, or other architectures offered by International Business Machines Corporation or other companies.

Bus 1018 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computing system 1012 can include a variety of computer system readable media. Such media may be any available media that is accessible by computing system 1012, and it includes both volatile and non-volatile media, removable and non-removable media.

System memory 1023 can include computer system readable media in the form of volatile memory, such as random access memory (RAM) 1030 and/or cache memory 1032. Computing system 1012 can further include other removable/non-removable, volatile/non-volatile computer system storage media. By way of example only, storage system 1034 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media could be provided. In such instances, each can be connected to bus 1018 by one or more data media interfaces. As described below, memory 1023 can include at least one program product having a set (e.g., at least one) of program modules or code that are configured to carry out the functions of embodiments of the invention.

Program/utility 1040, having a set (at least one) of program modules 1042, can be stored in memory 1032 by way of example, and not limitation, as well as an operating system, one or more application programs, other program modules, and program data. Each of the operating system, one or more application programs, other program modules, and program data or some combination thereof, can include an implementation of a networking environment. Program modules 1042 generally carry out the functions and/or methodologies of embodiments of the invention as described herein. Alternatively, a machine-learned data management facility, module, logic, etc., 1001 can be provided within computing environment 1012, as disclosed herein.

Computing system 1012 can also communicate with one or more external devices 1014 such as a keyboard, a pointing device, a display 1024, etc.; one or more devices that enable a user to interact with computing system 1012; and/or any devices (e.g., network card, modem, etc.) that enable computing system 1012 to communicate with one or more other computing devices. Such communication can occur via Input/Output (I/O) interfaces 1022. Still yet, computing system 1012 can communicate with one or more networks such as a local area network (LAN), a general wide area network (WAN), and/or a public network (e.g., the Internet) via network adapter 1020. As depicted, network adapter 1020 communicates with the other components of computing system, 1012, via bus 1018. It should be understood that although not shown, other hardware and/or software components could be used in conjunction with computing system 1012. Examples, include, but are not limited to: microcode, device drivers, redundant processing units, external disk drive arrays, RAID systems, tape drives, and data archival storage systems, etc.

One or more aspects may relate to or use cloud computing.

It is understood in advance that although this disclosure includes a detailed description on cloud computing, implementation of certain teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

A cloud computing node can include a computer system/server, such as the one depicted in FIG. 10. Computer system/server 1012 of FIG. 10 can be practiced in distributed cloud computing environments where tasks are performed by remote processing devices that are linked through a communications network. In a distributed cloud computing environment, program modules may be located in both local and remote computer system storage media including memory storage devices. Computer system/server 1012 is capable of being implemented and/or performing any of the functionality set forth hereinabove.

Figure 11:
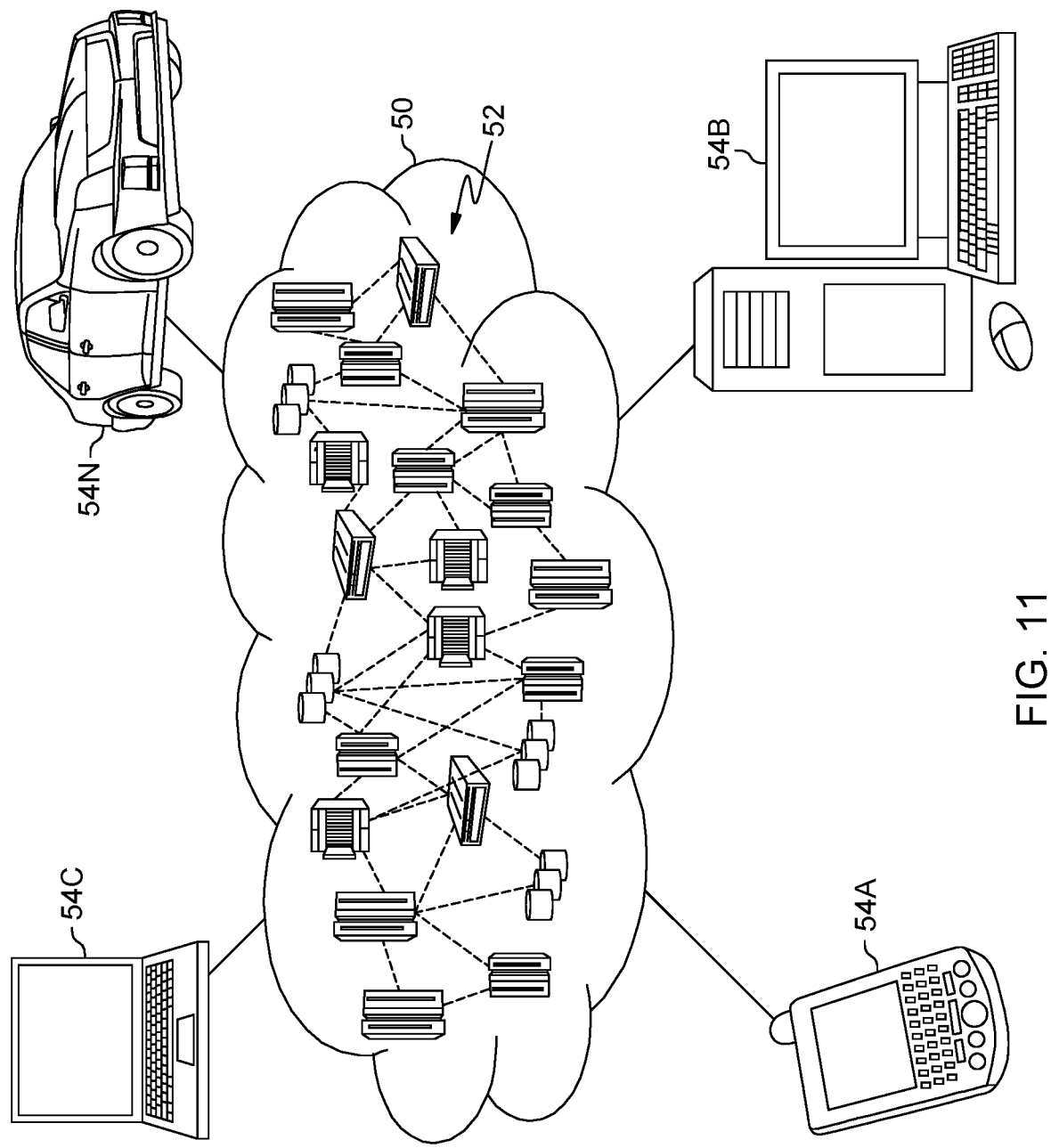
FIG. 11 depicts an embodiment of a cloud computing environment which can facilitate implementing, or be used in association with, certain aspects of an embodiment of the present invention.

Referring now to FIG. 11, illustrative cloud computing environment 50 is depicted. As shown, cloud computing environment 50 can comprise one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 12:
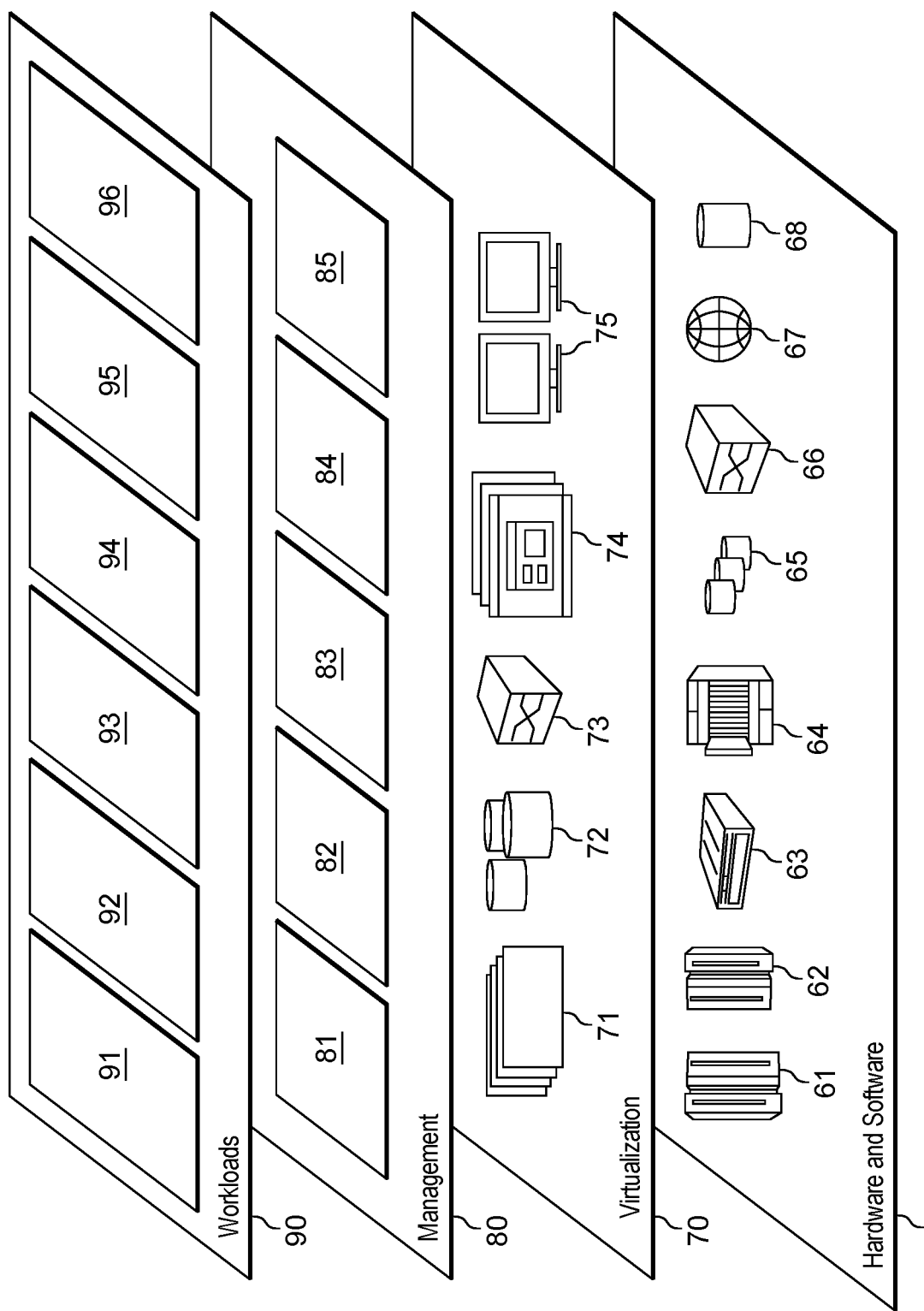
FIG. 12 depicts abstraction model layers according to an embodiment of the present invention.

Referring to FIG. 12, a set of functional abstraction layers provided by cloud computing environment 50 (FIG. 11) is shown. It should be understood in advance that the components, layers, and functions shown in FIG. 11 are intended to be illustrative only and embodiments of the invention are not limited thereto. As depicted, the following layers and corresponding functions are provided:

Hardware and software layer 60 includes hardware and software components. Examples of hardware components include mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and machine-learned data management processing 96.

The descriptions of the various embodiments of the present invention have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be a system, a method, and/or a computer program product at any possible technical detail level of integration. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer-implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, computing environments of other architectures can be used to incorporate and use one or more embodiments. Further, different instructions, instruction formats, instruction fields and/or instruction values may be used. Many variations are possible.

Further, other types of computing environments can benefit and be used. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form contain, such as "contains" and "containing") are open-ended linking verbs. As a result, a method or device that "comprises", "has", "includes" or "contains" one or more steps or elements possesses those one or more steps or elements, but is not limited to possessing only those one or more steps or elements. Likewise, a step of a method or an element of a device that "comprises", "has", "includes" or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of one or more aspects of the invention and the practical application, and to enable others of ordinary skill in the art to understand one or more aspects of the invention for various embodiments with various modifications as are suited to the particular use contemplated.

What is claimed is:

1. A computer-implemented method of managing machine-learned data, the computer-implemented method comprising:
    obtaining, by one or more processors, a machine-learned data set of a first device, the machine-learned data set of the first device comprising data captured by a first machine-learning model of the first device over time from end-user use of the first device, and the machine-learned data set of the first device being categorized machine-learned information that enhances performance of the first device based on the end-user use of the first device;
    determining, by the one or more processors, one or more device hardware requirements to use the machine-learned data set of the first device;
    based on receiving a request to provide the machine-learned data set of the first device to a second machine-learning model of a second device, determining, by the one or more processors, whether the second device meets the one or more device hardware requirements to use the machine-learned data set of the first device; and
    based on determining that the second device meets the one or more device hardware requirements, providing the machine-learned data set of the first device to the second machine-learning model of the second device to provide the categorized machine-learned information of the first device to the second device for use by the second device to enhance performance of the second device based on the end-user use of the first device resulting in capture of the machine-learned data set.

2. The computer-implemented method of claim 1, wherein providing the categorized machine-learned information of the first device to the second device provides an additional machine-learned skill to the second device, or enhances an existing machine-learned skill of the second device.

3. The computer-implemented method of claim 1, further comprising determining a category type of the machine-learned data set of the first device to provide the categorized machine-learned information, and wherein the determining the one or more device hardware requirements to use the machine-learned data set of the first device comprises using the category type of the machine-learned data set of the first device in determining the one or more device hardware requirements.

4. The computer-implemented method of claim 3, wherein the category type is selected from the group of category types consisting of image recognition, voice recognition, natural language processing, sequence of actions, robotics, and conversation services.

5. The computer-implemented method of claim 3, wherein the category type of the machine-learned data set includes multiple sub-category types, and wherein the method further comprises determining a sub-category type of the multiple sub-category types for the machine-learned data set of the first device, wherein the determining of the one or more device hardware requirements to use the machine-learned data set of the first device comprises using the category type and the sub-category type of the machine-learned data set of the first device in determining, by the one or more processors, the one or more device hardware requirements.

6. The computer-implemented method of claim 3, further comprising determining, by the one or more processors, a first machine-learned skill of the first device using, at least in part, the category type of the machine-learned data set, and obtaining, by the one or more processors, a second machine-learned skill of the second device, wherein the first and second machine-learned skills are different machine-learned skills or different machine-learned skill levels, and providing the machine-learned data set of the first device to the second device augments the second device with the first machine-learned skill of the first device.

7. The computer-implemented method of claim 1, wherein the machine-learned data set of the first device is one machine-learned data set of the first device of multiple machine-learned data sets of the first device.

8. The computer-implemented method of claim 1, wherein the first device is a first machine-learning device and the second device is a second machine-learning device, and wherein the first machine-learning device and the second machine-learning device are a same type of machine-learning robotic device.

9. The computer-implemented method of claim 1, wherein the first device is a first machine-learning device and the second device is a second machine-learning device, and wherein the first machine-learning device and the second machine-learning device are different types of machine-learning robotic devices.

10. The computer-implemented method of claim 1, further comprising:
obtaining, by the one or more processors, another machine-learned data set of a third device, the other machine-learned data set of the third device comprising data captured by a third machine-learning model of the third device over time from end-user use of the third device, and the other machine-learned data set of the third device being additional, categorized machine-learned information that enhances performance of the third device based on the end-user use of the third device;
determining, by the one or more processors, one or more device hardware requirements to use the other machine-learned data set of the third device;
based on receiving a request to provide the other machine-learned data set of the third device to the second machine-learning model of the second device, determining, by the one or more processors, whether the second device meets the one or more device hardware requirements to use the other machine-learned data set of the third device; and
based on determining that the second device meets the one or more device hardware requirements, providing the other machine-learned data set of the third device to the second machine-learning model of the second device to provide the additional, categorized machine-learned information of the third device to the second device for use by the second device to enhance performance of the second device based on the end-user use of the third device resulting in capture of the other machine-learned data set.

11. The computer-implemented method of claim 1, further comprising obtaining, by the one or more processors, an indication of an authorization by the end-user of the first device to provide the categorized machine-learned information of the first device to the second device, and wherein providing the machine-learned data set of the first device to the second device is based, at least in part, on obtaining the indication of authorization by the end-user of the first device to allow the providing of the categorized machine-learned information of the first device to the second device.

12. A system of managing machine-learned data, the system comprising:
a memory;
one or more processors in communication with the memory; and
program instructions executable by the one or more processors via the memory to perform a method comprising:
obtaining, by one or more processors, a machine-learned data set of a first device, the machine-learned data set of the first device comprising data captured by a first machine-learning model of the first device over time from end-user use of the first device, and the machine-learned data set of the first device being categorized machine-learned information that enhances performance of the first device based on the end-user use of the first device;
determining, by the one or more processors, one or more device hardware requirements to use the machine-learned data set of the first device;
based on receiving a request to provide the machine-learned data set of the first device to a second machine-learning model of a second device, determining, by the one or more processors, whether the second device meets the one or more device hardware requirements to use the machine-learned data set of the first device; and
based on determining that the second device meets the one or more device hardware requirements, providing the machine-learned data set of the first device to the second machine-learning model of the second device to provide the categorized machine-learned information of the first device to the second device for use by the second device to enhance performance of the second device based on the end-user use of the first device resulting in capture of the machine-learned data set.

13. The computer system of claim 12, wherein providing the categorized machine-learned information of the first device to the second device provides an additional machine-learned skill to the second device, or enhances an existing machine-learned skill of the second device.

14. The computer system of claim 12, further comprising determining a category type of the machine-learned data set of the first device to provide the categorized machine-learned information, and wherein the determining the one or more device hardware requirements to use the machine-learned data set of the first device comprises using the category type of the machine-learned data set of the first device in determining the one or more device hardware requirements.

15. The computer system of claim 14, wherein the category type is selected from the group of category types consisting of image recognition, voice recognition, natural language processing, sequence of actions, robotics, and conversation services.

16. The computer system of claim 14, wherein the category type of the machine-learned data set includes multiple sub-category types, and wherein the method further comprises determining a sub-category type of the multiple sub-category types for the machine-learned data set of the first device, wherein the determining of the one or more device hardware requirements to use the machine-learned data set of the first device comprises using the category type and the sub-category type of the machine-learned data set of the first device in determining, by the one or more processors, the one or more device hardware requirements.

17. The computer system of claim 14, further comprising determining, by the one or more processors, a first machine-learned skill of the first device using, at least in part, the category type of the machine-learned data set, and obtaining, by the one or more processors, a second machine-learned skill of the second device, wherein the first and second machine-learned skills are different machine-learned skills or different machine-learned skill levels, and providing the machine-learned data set of the first device to the second device augments the second device with the first machine-learned skill of the first device.

18. A computer program product comprising:
a computer-readable storage medium having computer-readable code embodied therein, the computer-readable code embodied therein, the computer-readable code being executable by one or more processors to cause the one or more processors to:
  obtain, by the one or more processors, a machine-learned data set of a first device, the machine-learned data set of the first device comprising data captured by a first machine-learning model of the first device over time from end-user use of the first device, and the machine-learned data set of the first device being categorized machine-learned information that enhances performance of the first device based on the end-user use of the first device;
  determine, by the one or more processors, one or more device hardware requirements to use the machine-learned data set of the first device;
  based on receiving a request to provide the machine-learned data set of the first device to a second machine-learning model of a second device, determine, by the one or more processors, whether the second device meets the one or more device hardware requirements to use the machine-learned data set of the first device; and
  based on determining that the second device meets the one or more device hardware requirements, provide the machine-learned data set of the first device to the second machine-learning model of the second device to provide the categorized machine-learned information of the first device to the second device for use by the second device to enhance performance of the second device based on the end-user use of the first device resulting in capture of the machine-learned data set.

19. The computer program product of claim 18, wherein providing the categorized machine-learned information of the first device to the second device provides an additional machine-learned skill to the second device, or enhances an existing machine-learned skill of the second device.

20. The computer program product of claim 18, further comprising determining a category type of the machine-learned data set of the first device to provide the categorized machine-learned information, and wherein the determining the one or more device hardware requirements to use the machine-learned data set of the first device comprises using the category type of the machine-learned data set of the first device in determining the one or more device hardware requirements.

* * * * *